June 20, 1961 L. P. THOMAS, JR 2,989,588

AUTOMATIC GAIN CONTROL SYSTEMS

Filed April 15, 1958

INVENTOR.
Lucius P. Thomas, Jr
BY
ATTORNEY

United States Patent Office 2,989,588

Patented June 20, 1961

2,989,588
AUTOMATIC GAIN CONTROL SYSTEMS

Lucius P. Thomas, Jr., Haddonfield, N.J., assignor to Radio Corporation of America, a corporation of Delaware Filed Apr. 15, 1958, Ser. No. 728,738
8 Claims. (Cl. 178—7.3)

The present invention relates to improvements in automatic gain control circuits for television receivers.

It is common practice in the design and construction of television receivers to provide an automatic gain control (AGC) circuit which controls the gain of the overall receiver as an inverse function of received signal strength. By this means, receiver performance and picture quality are rendered more immune to changes in received signal strength. This automatic gain control function is generally accomplished by developing a control voltage which is a function of received signal strength. The control voltage, frequently referred to as an automatic gain control voltage, is applied to one or more amplifiers handling received television signals in a manner which acts to decrease the gain of the receiver as the received signal strength increases.

It has been proposed, as one means for developing the required automatic gain control voltage, to employ the average direct current flow through the television receiver second detector. The magnitude of the direct current flow through the second detector is, of course, a function of both the received signal intensity as well as the brightness or D.C. component of the television scene to be reproduced. According to United States standards, a decrease in scene brightness will produce a decrease in average current flow through the second detector of a television receiver in the same manner as a reduction in the received signal intensity. To correct this, it has also been proposed to subtractively combine with the voltage derived from the second detector current flow, a voltage which represents only the scene brightness or D.C. picture component of the television signal. Under certain conditions, the resulting voltage represents only variations in the intensity, or peak-to-peak amplitude, of the received television radio carrier and is suitable for automatic gain control purposes. One convenient point at which a correction signal which represents only scene brightness may be derived is at the control grid of a conventional synchronizing signal separator stage. In this stage the grid-cathode current flow determines the self bias of the separator stage to establish the separating threshold, and hence is a function of the level of the video signal applied thereto.

The automatic gain control potential derived from such circuits is not in all cases sufficient to maintain the demodulated video signal level substantially constant for wide changes of input signal strengths. If the amplitude level of the demodulated video signal varies over an excessive range, the signal amplifiers may become overloaded resulting in cross-modulation distortion and clipping of the synchronizing signal components of the video wave. Similarly, on weak signals, the AGC voltage will not be sufficiently reduced such that the video output will be low, and the noise factor will be poor. In order to provide the necessary control action, the AGC potential may be amplified, but the additional amplifier tube and circuit would defeat the inherent simplicity of the circuit.

It is an object of the present invention to overcome the above mentioned and other disadvantages by utilizing existing signal translating stages for enhancing or amplifying the developed automatic gain control potential.

It is another object of this invention to provide an improved automatic gain control circuit of the type described wherein the demodulated video signal is maintained more nearly constant with changes in the strength of a received signal modulated carrier wave.

A further object of this invention is to provide an improved automatic gain control circuit of the type described having a sufficient delay characteristic so that maximum gain is achieved for weak signals, and providing amplification of the AGC voltage developed in response to stronger signals.

The present invention overcomes the above disadvantages by providing means for amplifying the developed automatic gain control potential without requiring additional tubes.

In one form of the present invention, as applied to television receivers, the actual voltage used for automatic gain control purposes is made up of three potentials: the first represents the rectified or demodulated carrier; the second represents the brightness component of the video signal being received; and the third is an amplified component of the first potential using the existing circuitry of the signal amplifiers. These three potentials are so combined to provide a voltage which varies in magnitude substantially only in response to variations in the intensity of the received radio television carrier and as such is suitable for use as an automatic gain control potential.

A better understanding of the present invention will be obtained by reference to the following specification, especially when considered in connection with the accompanying drawings, in which.

Figure 1:
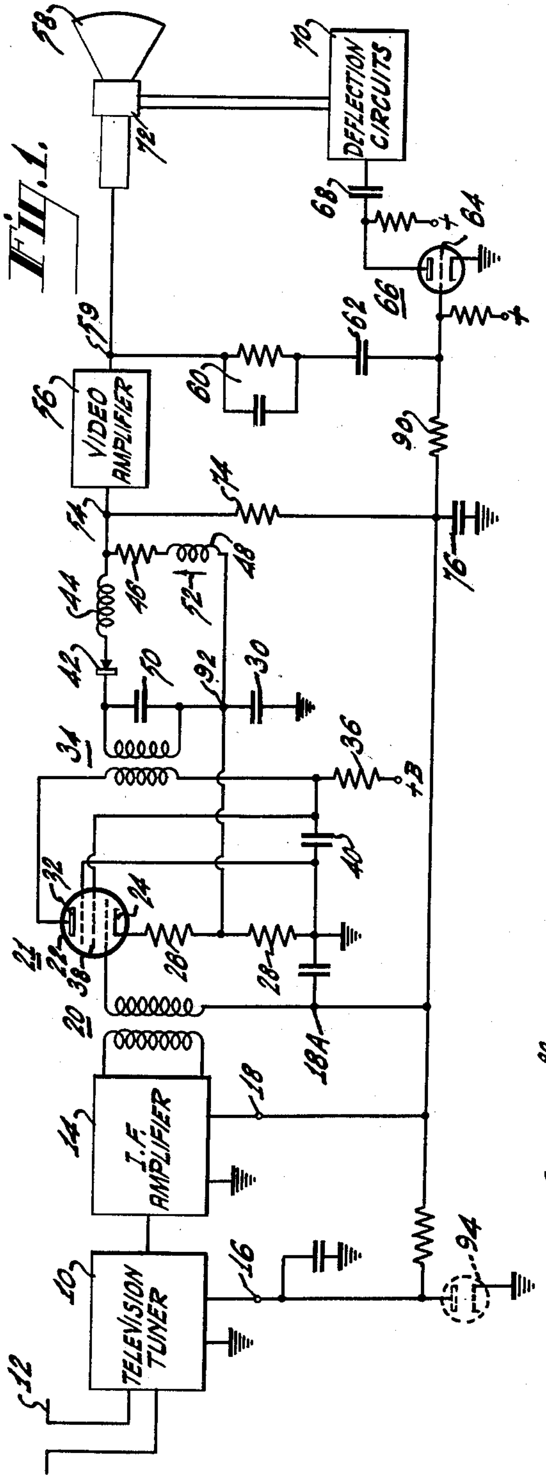
FIGURE 1 is a combination block and schematic circuit diagram representation of a television receiver embodying the present invention wherein the developed AGC voltage is amplified in one of the I.F. amplifiers.

Turning now to the drawings wherein like reference numerals are used in the various figures to designate similar elements, and particularly to FIGURE 1, a conventional television tuner 10 is operatively connected with a receiving antenna 12. Output signals from the television tuner 10 are conventionally applied to intermediate frequency amplifier 14 comprising one or more amplifying stages. It will be noted that the television tuner 10 and the intermediate frequency amplifier 14 have automatic gain control voltage input terminals 16 and 18 respectively.

The signals from the intermediate frequency amplifier 14 are specifically shown to be inductively coupled via the transformer 20 to a further intermediate frequency amplifier stage 21 including an electron tube 22 and which has an AGC terminal **18*a***.

The intermediate frequency amplifier tube 22 includes a cathode 24 which is connected to ground through a pair of series connected resistors 26 and 28. The resistor 26 is unbypassed to provide the desired amount of degeneration in the intermediate frequency amplifier stage, and the resistor 28 is bypassed for signal frequency currents by a capacitor 30. The anode 32 of the amplifier tube 22 is connected to an operating potential supply source designated +B, through the primary winding of an I.F. transformer 34 and a decoupling resistor 36. The screen grid 38 of the amplifier tube 22 is also connected to the +B operating potential supply source through the resistor 36 which is bypassed to ground for signal frequencies by a capacitor 40.

The signals amplified by the tube 22 are coupled through the transformer 34 to a video detector rectifier 42 which is connected to demodulate the I.F. television signals. The resultant demodulated signals are developed across a load circuit which comprises an inductor 44, a resistor 46, an inductor 48 and a capacitor 50. The direction of classical electric current flow through the demodulator load circuit is shown by the arrow 52. This, of course, is opposite to the direction of actual electron current flow.

Demodulated television signals are extracted from the load circuit at the terminal 54 and applied to a video amplifier 56, the output circuit of which is connected to drive a kinescope 58. Video signals appearing at an output terminal 59 for the video amplifier 56 are also coupled through a time constant circuit 60 and a capacitor 62 to the control electrode 64 of the sync separator stage tube 66. Output signals from the sync separator tube 66 are coupled through a capacitor 68 to the deflection circuits 70 by which deflection signals are developed for application to a deflection yoke 72 associated with the kinescope 58.

For purposes of this description, it will be assumed that the automatic gain control voltage to be applied to the automatic gain control terminals 16, 18 and **18*a* tends to become more negative with respect to circuit ground as signal intensity increases and that a more negative AGC voltage reduces the overall receiver gain. The AGC developed for this purpose is primarily dependent on the average output potential of the video detector 42, and is applied to the AGC terminals 16 and 18 through the filter network comprising the resistor 74 and the capacitor 76**. As is well known in the art, the average output of an amplitude detector used in demodulating amplitude demodulated radio carriers, is a direct function of the intensity of the received signal. However, the average output of the video detector is also a function of scene brightness.

Figure 2:
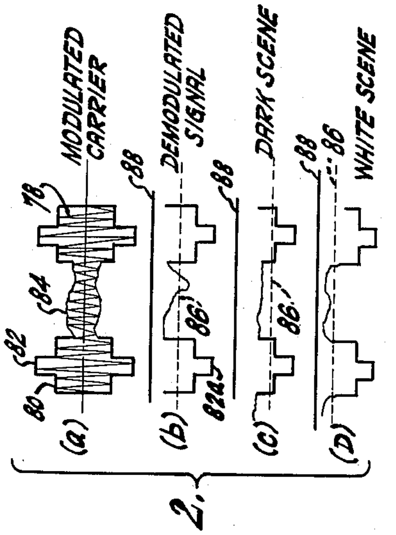
FIGURE 2 is a graphical representation of certain electrical waveforms typically encountered in the practice of the present invention.

The character of the signal applied to the input of the video detector 42 is, by way of example, illustrated in FIGURE 2*a*. FIGURE 2*a* shows a carrier signal 78 which is amplitude modulated by a composite television signal. This signal comprises a blanking component 80, a synchronizing component 82 and a video component 84. In the particular arrangement shown, the signal at the output of the video detector 42 will be substantially of the form shown in FIGURE 2*b* which is of opposite polarity. That is, the demodulated synchronizing component **82*a* will extend in a negative going direction. The dotted line 86 illustrates the A.C. axis of the television signal and depicts the average D.C. value of the potential at detector terminal 54 relative to ground as represented by the line 88. Should the received signal intensity become greater, the AGC action tends to reduce the overall receiver gain so that the average potential at terminal 54** will remain substantially the same. The AGC action also tends to reduce the overall receiver gain if the video component of the received television signal decreases as in the case of a darker picture. A demodulated television signal representing a darker picture is shown in FIGURE 2*c*. Contrariwise, should the received picture information correspond to a whiter scene, the waveform in FIGURE 2*d* is representative. Thus, under the conditions of a white scene, the receiver gain is increased by the AGC loop action so that the average potential at the terminal 54 will remain substantially at the same level. It, therefore, appears that the potential at the AGC terminals 16, 18 and **18*a* which is a filtered version of the potential at terminal 54**, does not by itself constitute a desirable automatic gain control voltage. This is because either a change in signal strength or a change in scene brightness will produce a change in the gain of the television receiver.

In accordance with prior arrangements, a scene brightness detecting means may be connected with the signal output circuit of the video amplifier 56 to develop a voltage at the AGC terminals 16, 18 and **18*a* which becomes more negative as the television scene becomes whiter and contrariwise, more positive (less negative) as the scene becomes darker. This statement is, of course, predicated upon the delivery to the video detecting means 42 of a composite television signal which does not, because of automatic gain control action, change appreciably in peak-to-peak value as a function of changes in the received signal strength. If, then, the output potential developed at sync separator control electrode 64 is mixed through resistor 90 with the potential appearing across the resistor 46 in the proper proportions, the video component of the received television signal can be combined in an opposite sense with the voltage at the AGC terminals 16, 18 and 18*a*** due to the video component so that the resulting automatic gain control potential is representative only of changes in the relative strength of the received radio television carrier. Under these conditions the sync separator control electrode to cathode operates as a peak detecting or rectifying means.

The control exercised over the R.F. and I.F. amplifier channels due to the voltage across the resistor 46 taken in combination with that developed at the sync separator grid 64 may not be sufficient to maintain the demodulated video signal level substantially constant for wide variations in the strength of a received signal applied to the R.F. amplifier portion of the tuner 10. Thus, for strong signals, the I.F. or video amplifier stages may be overloaded, resulting in clipping of the synchronizing signal thereby causing a loss of synchronization. Furthermore, the overloading causes the amplification characteristic to become non-linear, thereby producing an objectionable noise in the sound channel commonly referred to as intercarrier buzz. For weak signals, the signal-to-noise ratio of the receiver is adversely affected since the receiver gain may not be sufficient to produce noise limiting in the video amplifier stage.

In accordance with the invention, automatic gain control action is enhanced by returning the detector 42 circuit to ground through the resistor 28, in such a manner that the resistors 46 and 28 are connected in series between the terminal 54 and ground. The rectifier 42 is connected such that the output terminal 54 is negative with respect to the terminal 92. Since the potential across the resistor 28 is a function of the I.F. amplifier tube 22 cathode current, the terminal 92 will be positive with respect to ground. This enhances the gain control action by providing a bootstrap amplification of the developed AGC signal. To illustrate, as a received signal increases in intensity, the gain of the amplifier tube 22 is reduced by virtue of the action of resistor 46 taken alone. This causes a reduced cathode 24 current to flow making the terminal 92 less positive or more negative. Thus, the total potential between the terminal 54 and ground becomes more negative which is in a direction to reduce the overall receiver gain. In other words, a change in signal strength produces an AGC action tending to alter the overall receiver gain, which AGC action is supplemented by a voltage derived as a function of the change in D.C. current through the gain controlled stages.

Since the potential at the terminal 92 is positive with respect to ground, by proper circuit design, the net potential at the terminal 54 can be made positive for weak signals thereby providing a delayed AGC potential. To prevent the positive voltage from causing distortion, a diode 94 which may comprise the grid-cathode path of one or more of the I.F. and R.F. amplifiers is connected between the AGC bus and ground. Thus, the AGC bus can go no more positive than ground potential.

With the AGC system of the invention, sufficient control action is provided to maintain the amplitude level of the demodulated video signal substantially constant. This permits the video amplifier to be designed to provide a substantially constant clipping level to limit noise signals of greater amplitude than the synchronizing signal components to reduce the effect thereof on the operation of the synchronizing signal separator circuit. Hence, the automatic gain control system exhibits a greater noise immunity than similar circuits of comparable complexity since the resultant AGC is a combination of the average level of the signal and a noise protected video component.

Figure 3:
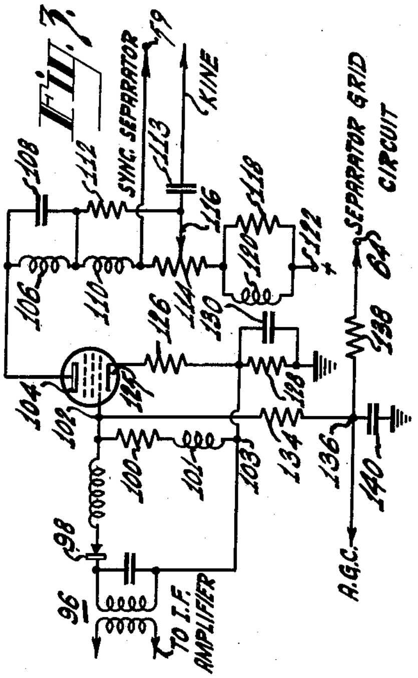
FIGURE 3 is a schematic representation showing another form of the present invention as it may be practiced in a television receiver, wherein the video amplifier is used to amplify the developed AGC voltage.

FIGURE 3 is a schematic circuit diagram of a modification of applicant's invention wherein the developed AGC voltage is amplified by a bootstrap amplification in the video amplifier stage of a television receiver. Signals from the receiver intermediate frequency amplifier are coupled through a transformer 96 to a video detector 98 having a load circuit, a portion of which is represented by a resistor 100 and an inductor 101. The demodulated television signals developed across the resistor 100 and inductor 101 are directly connected to the input terminals 102 and 103 of a video amplifier tube 104. The anode of the video amplifier tube 104 is conventionally coupled to an output load circuit comprising an inductor 106, a capacitor 108, an inductor 110, a resistor 112, a variable resistor 114 having a movable tap 116, a resistor 118 and an inductor 120. The lower extremities of the resistor 118 and inductor 120 are connected to a source of polarizing potential for the anode of the video amplifier tube 104. This source of potential has not been shown and is provided with a positive terminal shown at 122 and a negative terminal (not shown) which is connected with circuit ground.

Amplified television signals from the amplifier 104 are coupled via capacitor 113 to a kinescope or other utilization means. The video signal for the kinescope is extracted from the load circuit at the movable tap 116 of the resistor 114. The movable tap 116 provides a contrast control for the receiver, and since it is located in the anode circuit of the video amplifier 104, the video signal amplitude which is fed to the sync separator stage is not changed as the contrast is adjusted.

Video signals appearing at the terminal 59, which is connected to the junction point between inductor 110 and resistor 114 are coupled through suitable time constant circuits to a sync separator stage (not shown). The potential developed at the control electrode 64 of the sync separator stage is proportional to the brightness component of the video signal described above with reference to FIGURES 1 and 2.

The video amplifier 104 includes a cathode 125 which is connected to ground through a pair of series connected resistors 126 and 128. The resistor 126 is unbypassed to provide the desired amount of degeneration of the amplifier stage and the resistor 128 is bypassed for signal frequency currents by capacitor 130.

The average D.C. potential appearing at the video amplifier input terminal 102 is applied through a resistor 134 to an AGC terminal 136. This potential is mixed with the video or brightness component potential derived from the sync separator grid which is also applied to the terminal 136 through a resistor 138. By proper proportioning of the voltage, the resultant AGC potential at the terminal 136 represents only the average carrier strength as described above in connection with FIGURES 1 and 2. This potential which is filtered by the action of the resistors 134 and 138 and a capacitor 140, is applied to the desired R.F. and I.F. gain controlled amplifier stages of the television receiver.

Current flow through the video detector rectifier 98 is in such a direction that the potential developed at the terminal 102 is negative with respect to the terminal 103 and tends to become more negative in response to an increase in received signal intensity. In accordance with the invention, the amount of change of average D.C. potential between the terminal 102 and ground for an incremental change for signal conditions is materially enhanced by amplifying the average D.C. component developed in the video detector circuit, and by adding the average D.C. component to the amplified component using a bootstrap arrangement.

Specifically, the average D.C. potential developed across the resistor 100 is directly applied between the control electrode (terminal 102) of the video amplifier 104 and the junction of the resistors 126 and 128 (terminal 103). As this average D.C. potential becomes more negative due to an increase in carrier strength, the current through the tube 104 decreases. This results in less current through the resistor 128 causing the potential at the terminal 103 to become less positive, or stated otherwise, more negative. The potential existing between the terminal 102 and ground is essentially the combination of the potentials across the resistors 100 and 128. Since for increasing signal intensities, the potentials across these resistors both change in the more negative direction, the net change in the average D.C. potential in a negative direction at the terminal 102 is much greater than would have occurred due to the use of resistor 100 alone. Conversely, when the average D.C. potential applied to the tube 104 becomes less negative due to a decrease in carrier strength, the current through the tube 104 increases. The voltage drop across the resistor 128 increases, causing the potential at the terminal 134 to become more positive (less negative), which enhances incremental changes in potential due to the voltage drop across the resistor 100 alone.

Having thus described the invention, what is claimed is:

1. In a television receiver for receiving, demodulating and transducing a standard television radio carrier into a visible television image, said television carrier being modulated wth a video signal having an average brightness component which defines the overall brightness of the television picture to be reproduced, variations in brightness in the television image to be reproduced being defined by changes in the average value of received carrier intensity, the combination of: automatic gain control means including a plurality of gain controlled signal amplifiers included in said receiver for varying the overall gain of said receiver as a function of radio carrier intensity, said automatic gain control means being responsive to an automatic gain control voltage; a demodulator circuit operatively coupled in said receiver to demodulate a television radio carrier signal into a video signal having a direct current potential component and an alternating current wave component, the magnitude of said direct current potential component being representative of both the desired scene brightness and the intensity of the received radio carrier; means connecting one of said amplifiers to amplify the direct current component of said video signal to provide an amplified direct current potential component; means for combining said amplified direct current potential component and said direct current potential component for developing a first potential in response to the combined amplified direct current component and direct current component of said video signal; a peak detecting means alternating current coupled with said demodulating means for developing a second direct current potential which for a given signal intensity varies substantially only with picture brightness information; means operatively combining said first and second potentials to produce a net voltage whose value represents substantially only the intensity of the received radio carrier; and means applying said net voltage to said automatic gain control means as an automatic gain control voltage therefor.

2. In a television receiving system for transducing standard radio television signals into a visible television image, said radio signals comprising a carrier amplitude modulated with a composite television signal including a synchronizing component, a blanking component and a video component, the signal level difference between the alternating current axis of said composite signal and the peak of either said blanking component or said synchronizing component substantially representing the average brightness of the television scene represented by said composite signal, the combination of: means connected in said receiver for rectifying received carrier signals amplitude modulated by said composite television signal to produce demodulated video signals having a direct current component and an alternating current component, the value of said direct current component representing both the strength of said carrier as applied to said rectifying means and the average brightness of the television scene represented by said composite television signal; controllable gain amplifying means operatively connected to apply received television carrier signals to said rectifying means, said amplifying means having at least one gain control terminal for accepting control potential for controlling the gain of said amplifying means; video signal amplifying means operatively coupled with said rectifying means for amplifying said demodulated video signal; said video signal amplifying means including a load impedance for deriving an amplified direct current component of said video signals; means for combining said amplified direct current component and said direct current component in a manner that the incremental changes of these components for a change in said received carrier signals are in the same polarity direction; means operatively applying the combined amplified direct current potential and the direct current potential component of said demodulated television signal to said amplifying means gain control terminal with such electrical sense as to decrease the gain of said amplifying means in response to both an increase in the intensity of received television carrier signal and a decrease in the average brightness of said television scene; rectifying means alternating current coupled with said video signal amplifying means to develop a first direct current potential, the value of which is a function of both the peak-to-peak amplitude of said amplified video signals and the average brightness of said television scene; and means operatively combining said first direct current potential with the potential applied to said gain control terminal in such electrical relation thereto as to produce a resultant potential at said gain control terminal in which variations attributable to changes in the average brightness component of said television scene are reduced.

3. In a television superheterodyne type receiving system for transducing standard radio television signals into a visible television image, said radio signals comprising a radio carrier amplitude modulated with a composite television signal including a synchronizing pulse component, a blanking component and a video component, the signal level difference between the alternating current axis of said composite signal and the peak of either said blanking component or said synchronizing pulse component substantially representing the average brightness of the television scene represented by said composite signal, the combination of: means converting received radio television signals into corresponding superheterodyne intermediate frequency signals; intermediate frequency amplifier means operatively coupled with said converting means for amplifying said intermediate frequency signals; gain control means operatively included in said intermediate frequency amplifier means for controlling the gain of said intermediate frequency amplifier means as a function of an applied gain control potential, said gain control means having a terminal for accepting said control potential for controlling the gain of said amplifier means; means coupled with said intermediate frequency amplifier means for demodulating amplified intermediate frequency signals to produce a video signal having a direct current potential component and an alternating current potential component, the value of said direct current component representing both the strength of the carrier signal applied to said receiver and the average brightness of the television scene represented by the composite television signal modulating said radio carrier; means providing a video amplifier including an input electrode, an output electrode and a common electrode; means direct current conductively connecting said input electrode and said common electrode to said demodulating means; means providing a load impedance connected betwen said common electrode and ground, and through ground to said output electrode; rectifying means for accepting an alternating current signal and producing a direct current potential representing amplitude of applied signal as well as the difference in level between the peak amplitude of said signal and the alternating current axis thereof; alternating current coupling means connected from said video amplifier to said rectifying means for rectifying amplified video signal to develop a first direct current potential representing the average brightness of the television scene to be reproduced; and direct current signal transducing means operatively applying said first potential to said gain control terminal with such an electrical sense that decrease in the average brightness of the television scene tends to increase the gain of said intermediate frequency amplifier; means for additively combining the potential developed across said load impedance with said direct current potential component of said demodulated intermediate frequency signal; and direct current signal transducing means operatively coupled between said demodulating means and the gain control terminal of said gain control means for applying to said gain control terminal the combined direct current potential component of said demodulated intermediate frequency signal and the potential developed across said load impedance with such an electrical sense that an increase in the intensity of the received radio carrier signals will produce a reduction in the gain of said intermediate frequency amplifier to a degree tending to maintain the amplitude of intermediate frequency signal applied to said demodulating means substantially constant over a wide range of radio carrier signal intensities, the gain of said amplifier means being likewise undesirably reduced in response to a decrease in the average brightness of the television scene represented by said composite television signal.

4. In a television receiver for receiving, demodulating and transducing a standard television radio carrier into a visible television image, said television carrier being modulated with a video signal having an average brightness component which defines the overall brightness of the television picture to be reproduced, variations in brightness in the television image to be reproduced being defined by changes in the average value of received carrier intensity, the combination of: automatic gain control means including at least one gain controlled signal amplifier for varying the overall gain of the receiver as a function of radio carrier intensity, said automatic gain control means being responsive to an automatic gain control voltage; a demodulator circuit operatively coupled in said receiver to demodulate a television radio carrier into a video signal having a direct current potential component and an alternating current wave component, the magnitude of said direct current potential component being representative of both the desired scene brightness and the intensity of the received radio carrier; means connecting said one amplifier with said demodulator circuit to amplify the direct current component of said video signal to provide an amplified direct current potential component; means for combining said amplified direct current potential component and said direct current potential component of said video signal for developing an automatic gain control voltage; and means for applying said automatic gain control voltage to said automatic gain control means for controlling the overall gain of said receiver.

5. In a television receiving system for composite television signals including a synchronizing component and a video component, the signal level difference between the alternating current axis of said composite signal and the peak of said synchronizing component substantially representing the average brightness of a television scene represented by said composite signal, an automatic gain control circuit comprising the combination of: a video detector including a first resistor connected in said receiver for demodulating received television radio carrier signals to produce a video signal so polarized that said synchronizing component thereof extends in a negative direction with respect to a point of fixed reference potential, said demodulated video signal having a direct current component developed across said first resistor representing both the strength of the received composite signal and the average brightness of a television scene represented by said television signal; a video signal amplifier device comprising an input electrode, an output electrode and a common electrode; a second resistor connecting said common electrode to said point of fixed reference potential; an input circuit including said first resistor direct current conductively connected between said input electrode and said common electrode and connected to said point of fixed reference potential through said second resistor whereby said video signal amplifier operates to develop across said second resistor said direct current component in amplified form; peak detecting means coupled to said video detector through said amplifier for developing a second direct current potential which for given signal intensity varies substantially only with picture brightness information; and means for combining said direct current component, said amplified direct current component and said direct current potential indicative of said picture brightness information to provide an automatic gain control potential.

6. In a television receiver for receiving, demodulating and transducing a standard television radio carrier into a visible television image, said television carrier being modulated with a video signal having an average brightness component which defines the overall brightness of the television picture to be reproduced, variations in brightness in the television image to be reproduced being defined by changes in the average value of received carrier intensity, the combination of: a plurality of cascade connected amplifiers; automatic gain control means including at least one of said amplifiers for varying the overall gain of the receiver as a function of radio carrier intensity, said automatic gain control means being responsive to an automatic gain control voltage; a demodulator circuit operatively coupled in said receiver between two of said amplifiers to demodulate a television radio carrier into a video signal having a direct current potential component and an alternating current wave component, the magnitude of said direct current potential component being representative of the intensity of the received radio carrier; means connecting one of said plurality of cascade connected amplifiers to amplify the direct current component of said video signal to provide an amplified direct current potential component; and means for combining said amplified direct current potential component and said direct current potential component of said video signal for developing an automatic gain control voltage; and means for applying said automatic gain control voltage to said automatic gain control means for controlling the overall gain of said receiver.

7. In a television receiver for receiving, demodulating and transducing a standard television radio carrier into a visible television image, said television carrier being modulated with a video signal having an average brightness component which defines the overall brightness of the television picture to the reproduced, variations in brightness in the television image to be reproduced being defined by changes in the overall value of received carrier intensity, the combination of: automatic gain control means including an intermediate frequency amplifier comprising an electron tube having an anode, a cathode and a control electrode; a resistor connected between said cathode and a point of reference potential for said receiver; said intermediate frequency amplifier being responsive to an automatic gain control potential applied to said control electrode for varying the gain thereof; an output circuit for said intermediate frequency amplifier coupled to said anode; a demodulator circuit coupled to said intermediate frequency amplifier output circuit and operable to demodulate a television radio carrier signal into a video signal having a direct current potential component and an alternating current wave component, said demodulator circuit including an output terminal and a load impedance element across which said direct current potential component is developed, the magnitude of said direct current component being representative of both the desired scene brightness and the intensity of the received radio carrier; means connecting said demodulator circuit load impedance element in series with said resistor between said video output terminal to said point of reference potential; and filter means connecting said video demodulator output terminal to the control electrode of said intermediate frequency amplifier tube for controlling the gain thereof in accordance with the potential at said video demodulator output terminal.

8. In a television receiver for receiving, demodulating and transducing a standard television radio carrier into a visible television image, said television carrier being modulated with a video signal having an average brightness component which defines the overall brightness of the television picture to be reproduced, variations in brightness in the television image to be reproduced being defined by changes in the overall value of received carrier intensity, the combination of: automatic gain control means including an intermediate frequency amplifier comprising an electron tube having an anode, a cathode and a control electrode, a resistor connected between said cathode and a point of reference potential for said receiver; said intermediate frequency amplifier being responsive to an automatic gain control potential applied to said control electrode for varying the gain thereof; an output circuit for said intermediate frequency amplifier coupled to said anode; a demodulator circuit coupled to said intermediate frequency amplifier output circuit and operable to demodulate a television radio carrier signal into a video signal having a direct current potential component and an alternating current wave component; said demodulator circuit including an output terminal and a load impedance element across which said direct current potential component is developed, the magnitude of said direct current component being representative of both the desired scene brightness and the intensity of the received radio carrier; means connecting said demodulator circuit load impedance element in series with said resistor between said demodulator output terminal to said point of reference potential, peak detecting means alternating current coupled with said demodulator circuit for developing a second direct current potential which for a given signal intensity varies substantially only with picture brightness information, means combining the potential between said demodulator output terminal and said point of reference potential with said second direct current potential to produce a net potential whose value varies substantially only the intensity of the received radio carrier; and means applying said net potential to said control electrode of said intermediate frequency amplifier tube for controlling the gain thereof in accordance with the potential at said video demodulator output terminal.

References Cited in the file of this patent

UNITED STATES PATENTS

| | | |
|---|---|---|
| Re. 24,336 | Fyler | July 16, 1957 |
| 2,653,226 | Mattingly | Sept. 22, 1953 |
| 2,698,357 | Hoyt | Dec. 28, 1954 |